(12) United States Patent
Fuller et al.

(10) Patent No.: US 11,402,047 B2
(45) Date of Patent: Aug. 2, 2022

(54) PORT ASSEMBLY FOR PERMITTING MATERIAL TRANSFER BETWEEN CONTAINED SYSTEMS

(71) Applicant: Closed Systems LLC, Port Orchard, WA (US)

(72) Inventors: Lee Fuller, Port Orchard, WA (US); David M. Pray, Bremerton, WA (US)

(73) Assignee: Closed Systems LLC, Port Orchard, WA (US)

( * ) Notice: Subject to any disclaimer, the term of this patent is extended or adjusted under 35 U.S.C. 154(b) by 300 days.

(21) Appl. No.: 16/725,943

(22) Filed: Dec. 23, 2019

(65) Prior Publication Data

US 2020/0200312 A1 Jun. 25, 2020

Related U.S. Application Data

(60) Provisional application No. 62/784,646, filed on Dec. 24, 2018.

(51) Int. Cl.
| | | |
|---|---|---|
| *F16L 23/12* | (2006.01) | |
| *F16L 37/256* | (2006.01) | |
| *F16L 31/00* | (2006.01) | |
| *F16L 21/08* | (2006.01) | |
| *F16L 23/00* | (2006.01) | |

(52) U.S. Cl.
CPC .............. *F16L 37/256* (2013.01); *F16L 21/08* (2013.01); *F16L 23/003* (2013.01); *F16L 31/00* (2013.01)

(58) Field of Classification Search
CPC ....... F16L 21/06; F16L 21/002; F16L 21/005; F16L 21/08; F16L 23/003; F16L 23/006; F16L 23/12; F16L 23/16; F16L 37/256; F16L 37/252; F16L 37/2445
USPC ....... 285/35, 71, 72, 80, 260, 283, 414, 415, 285/419
See application file for complete search history.

(56) References Cited

U.S. PATENT DOCUMENTS

2018/0224030 A1* 8/2018 Clapper .................. F16L 25/12

* cited by examiner

*Primary Examiner* — Aaron M Dunwoody
(74) *Attorney, Agent, or Firm* — Kunzler Bean & Adamson

(57) ABSTRACT

An illustrative port assembly includes a male port assembly including a male frame sub-assembly having first and second hinged male frame members rotatable about a first axis, the first and second hinged male frame members being sealable therebetween. A first transfer sleeve is attachable to the male port assembly and is configured to operably connect the male port assembly with a first volume. A female port assembly includes a female frame sub-assembly having first and second hinged female frame members rotatable about a second axis that is coaxially alignable with the first axis. The first and second hinged female frame members are sealable therebetween, and the female frame sub-assembly is sealable with the male frame sub-assembly. A second transfer sleeve is attachable to the female port assembly and is configured to operably connect the female port assembly with a second volume.

20 Claims, 4 Drawing Sheets

PORT ASSEMBLY FOR PERMITTING MATERIAL TRANSFER BETWEEN CONTAINED SYSTEMS

RELATED APPLICATION

This patent application claims priority from U.S. Provisional Patent Application Ser. No. 62/784,646, filed Dec. 24, 2018 and entitled "DETACHABLE NESTING PORT ALLOWING MATERIAL TRANSFER BETWEEN CONTAINED SYSTEMS," the entire contents of which are hereby incorporated by reference.

STATEMENT AS TO RIGHTS TO INVENTIONS

This invention was made by a United States Government employee, and the United States Government has a nonexclusive, irrevocable, royalty-free license in the invention with the power to grant licenses for all Government purposes.

FIELD

Disclosed embodiments relate to material transfer apparatuses.

BACKGROUND

The statements in this section merely provide background information related to the present disclosure and may not constitute prior art.

Industrial, commercial, and private sector operations may entail device(s) which seek to control access to a system and employ methods to increase or maintain system isolation from the surrounding environment. Fields of industry which readily employ such systems include pharmaceutical manufacture, general food processing, general waste processing, chemical processing, radioactive material handling, biological material handling, and the like.

System isolation is typically accomplished via two methods: (1) encapsulation of a work area through establishment of a controlled work environment; or (2) direct isolation of the working system while employing transfer ports which allow controlled interaction with an isolated system. In most cases, a level of system isolation is commensurate with sensitivity of the materials or environment.

Total isolation systems have been employed to interact with highly sensitive materials where undesirable material contaminants may result in costly ramifications to product, environment, or personnel. In general, total isolation systems contain at least one port with the capability to transfer materials to and from an enclosed vessel while limiting or preventing exposure between the system and the surrounding environment.

One such device commonly used to perform this function is referred to as a rapid transfer port ("RTP"). Prolonged use and refinement of RTPs have resulted in features such as safety interlocks or external operation. Some such designs may use a "double door" transfer port that includes back-to-back nesting doors which provide controlled material transfer between two enclosed volumes. Typical installation of an RPT includes a female port assembly including a hinge and locking mechanism affixed to an isolation chamber boundary. An enclosed volume or vessel including a male port may be attached to the female port and opened within the controlled volume to introduce materials into the isolated system. Conversely, an attached male port (with an enclosed volume) may be disconnected from the closed female port and isolation chamber to remove materials from the isolated system.

In general, the RTP device is suited for permanently installed reusable fixtures or to provide isolated system access for repetitive use. Furthermore, RPT devices are primarily designed to integrate with rigid structure components and may be appropriate for installation into fixed, monolithic systems. The primary limitations of RPT devices regard design complexity, perceived manufacturing cost, and generally limited portability.

On the other hand, partial isolation systems may be employed to interact with less sensitive materials where undesirable interactions may have significantly fewer ramifications. In general, a partial isolation system may include less sophisticated access ports that are designed to separate, store, and transfer waste materials away from an environment.

A common feature between such designs is the use of flexible, inexpensive, and/or disposable materials to handle and contain waste. To that end, the designs mentioned above rely on interaction of a flexible material with a hinge or lid isolation system. In general, a one-way operation is provided wherein waste materials enter the system in a controlled manner, can potentially be isolated from other waste products during entry, are stored under isolation for a suitable amount of time, and eventually may be removed as bulk waste.

SUMMARY

Disclosed embodiments include illustrative port assemblies for permitting material transfer between contained systems, illustrative methods of fabricating port assemblies for permitting material transfer between contained systems, and illustrative methods of transferring material between contained systems.

In a non-limiting embodiment, an illustrative port assembly includes a male port assembly including a male frame sub-assembly having first and second hinged male frame members rotatable about a first axis, the first and second hinged male frame members being sealable therebetween. A first transfer sleeve is attachable to the male port assembly and is configured to operably connect the male port assembly with a first volume. A female port assembly includes a female frame sub-assembly having first and second hinged female frame members rotatable about a second axis that is coaxially alignable with the first axis. The first and second hinged female frame members are sealable therebetween, and the female frame sub-assembly is sealable with the male frame sub-assembly. A second transfer sleeve is attachable to the female port assembly and is configured to operably connect the female port assembly with a second volume.

In another non-limiting embodiment, an illustrative port assembly includes a male port assembly including a male frame sub-assembly having first and second hinged male frame members rotatable about a first axis, the first and second hinged male frame members being sealable therebetween. A first hinge joint is configured to hingedly couple the first and second hinged male frame members. A first intra-locking mechanism is disposed on the male frame sub-assembly and is configured to releasably lock the male frame sub-assembly in a closed position. A first inter-locking mechanism is disposed on the male frame sub-assembly. A first transfer sleeve is attachable to the male port assembly and is configured to operably connect the male port assembly with a first volume. A female port assembly includes a female frame sub-assembly having first and second hinged female frame members rotatable about a second axis that is coaxially alignable with the first axis, the first and second hinged female frame members being sealable therebetween, the female frame sub-assembly being sealable with the male frame sub-assembly. A second hinge joint is configured to hingedly couple the first and second hinged female frame members. A second intra-locking mechanism is disposed on the female frame sub-assembly and is configured to releasably lock the female frame sub-assembly in a closed position. A second inter-locking mechanism is disposed on the female frame sub-assembly, the first and second inter-locking mechanisms being configured to matingly engage each other such that the male frame sub-assembly and the female frame sub-assembly remain coupled to each other when the first and second inter-locking mechanisms matingly engage each other. A second transfer sleeve is attachable to the female port assembly and is configured to operably connect the female port assembly with a second volume.

In another non-limiting embodiment, an illustrative method includes sealingly closing a female port assembly; sealingly closing a male port assembly; sealingly mating the closed female port assembly and the closed male port assembly with each other; axially aligning a hinge joint of the female port assembly and a hinge joint of the male port assembly with each other; and opening the axially-aligned hinge joints of the female port assembly and the male port assembly.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

The use of the same symbols in different drawings typically indicates similar or identical items unless context dictates otherwise.

DETAILED DESCRIPTION

Figure 1:
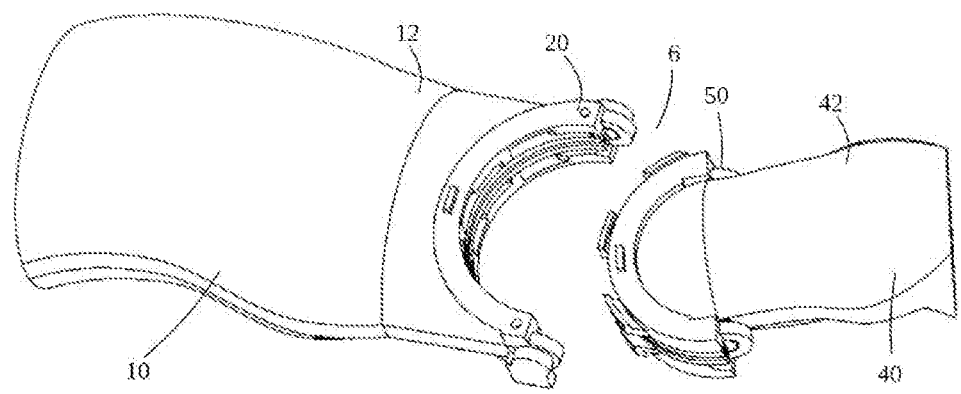
FIG. 1 is an isometric view of a combined port assembly showing male and female port assemblies in a disengaged configuration.

The following description is merely illustrative in nature and is not intended to limit the present disclosure, application, or uses.

Referring to FIGS. 1-10 and given by way of overview and illustration only and not of limitation, disclosed embodiments include a port assembly 6 that allows material transfer between contained systems (not shown). In some embodiments, the port assembly 6 can help provide material transfer between two contained systems while seeking to avoid compromising system isolation with respect to the surrounding environment. In various embodiments, the port assembly 6 may be embodied as a detachable nesting port. In such embodiments, the port assembly 6 includes a female port assembly 10 and a male port assembly 40. The female port assembly 10 includes a female hinged sub-assembly frame 20 that is attached to a flexible material volume 12, and the male port assembly 40 includes a male hinged sub-assembly frame 50 that is attached to a flexible material volume 42.

Still by way of overview, in various disclosed embodiments the port assembly 6 may help provide communication between two controlled volumes. It will be appreciated that disclosed embodiments can help to provide a framework for an isolated access port which may be operated externally, may be readily adaptable to varying industry and safety requirements, and/or may not be limited to fixed monolithic positions. It will also be appreciated that disclosed embodiments can help contribute to improving upon existing partial isolation system designs by helping to maintain likewise functionality while helping contribute to retention of total isolation system capability if deemed desired.

Now that an overview has been presented, further features, advantages, and areas of applicability will become apparent from the description provided herein. It will be understood that the description and specific examples are intended for purposes of illustration only and are not intended to limit the scope of the present disclosure.

Figure 3:
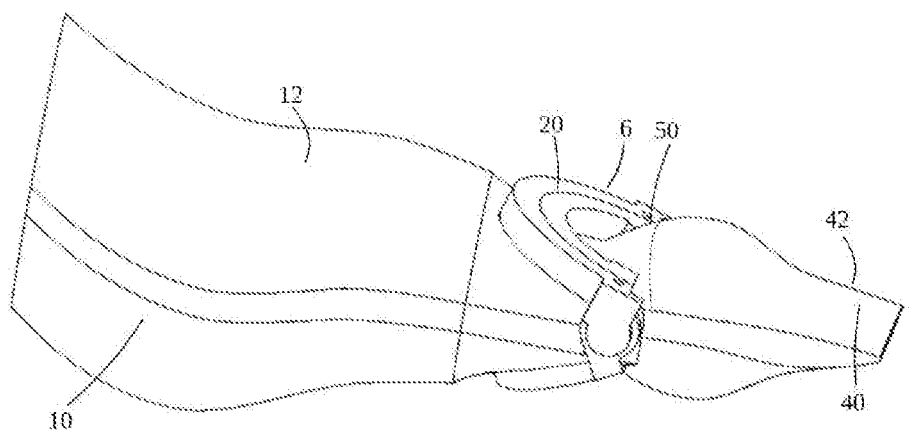
FIG. 3 is an isometric view of the combined port assembly of FIG. 1 showing the male and female port assemblies in an engaged-and-partially-opened configuration.
Figure 4:
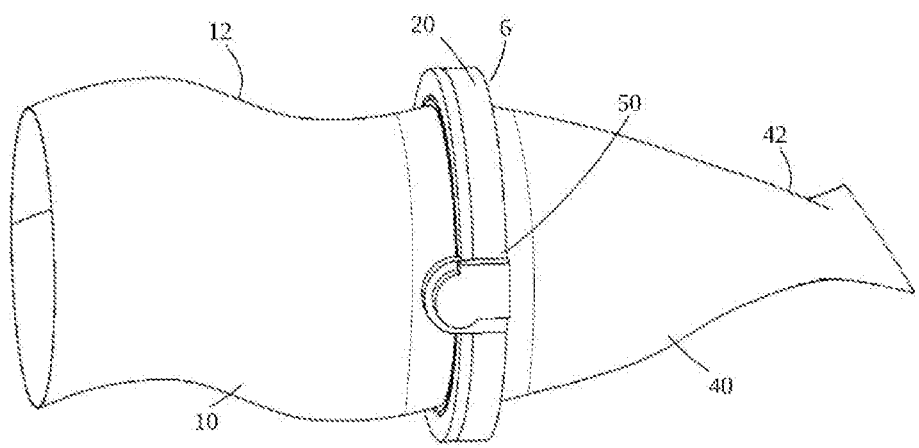
FIG. 4 is an isometric view of the combined port assembly of FIG. 1 showing the male and female port assemblies in an engaged-and-fully-opened configuration.
Figure 5:
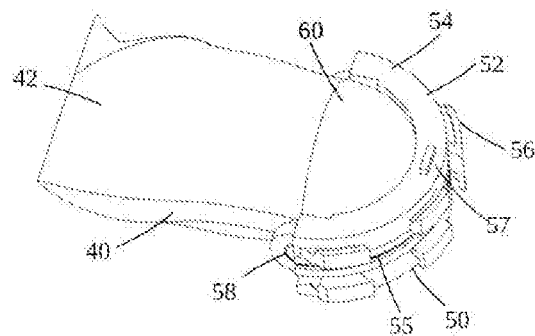
FIG. 5 is an isometric view of the male port assembly of FIG. 1 in a closed configuration.
Figure 6:
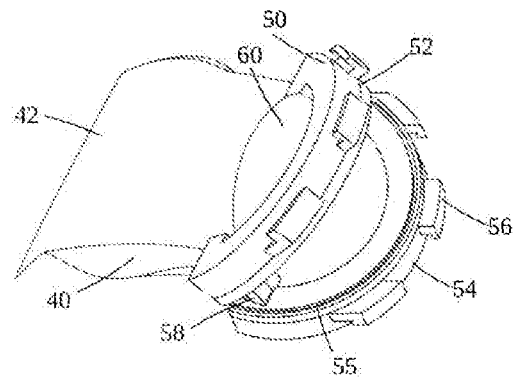
FIG. 6 is an isometric view of the male port assembly of FIG. 1 in a partially opened configuration.
Figure 7:
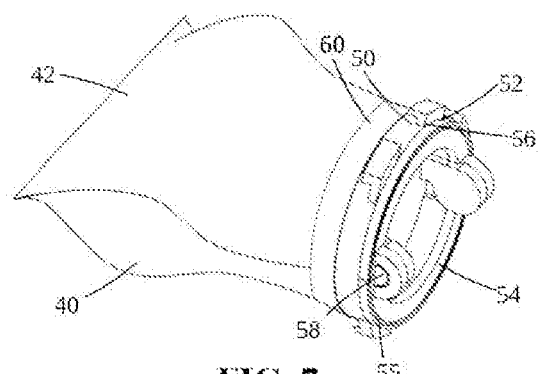
FIG. 7 is an isometric view of the male port assembly of FIG. 1 in a fully opened configuration.

Referring to FIGS. 1-10, in various embodiments the port assembly 6 includes the female port assembly 10 (that includes the female hinged sub-assembly frame 20) and the male port assembly 40 (that includes the male hinged sub-assembly frame 50). The female hinged sub-assembly frame 20 includes frame members 22 and 24 (FIGS. 8-10) and the male sub-assembly frame 50 includes frame members 52 and 54 (FIGS. 5-7).

In various embodiments, the female hinged sub-assembly frame 20, the male hinged sub-assembly frame 50, and the hinge joints 28 and 58 may be of circular form. In such embodiments, inter-locking mechanisms 26 and 56, respectively, are conducive to rotation of the circular frame. It will be appreciated that disclosed port assemblies may also include a non-circular framework and that change in the framework form may entail a change in the inter-locking mechanism design and operation. Given by way of non-limiting examples, inter-locking mechanisms 26 and 56 may include any suitable external or internal physical interference locking mechanism as desired for a particular application, such as a latch, hasp, pin, or the like, or may include magnetic interlocks operated by manual or remote means.

Figure 2:
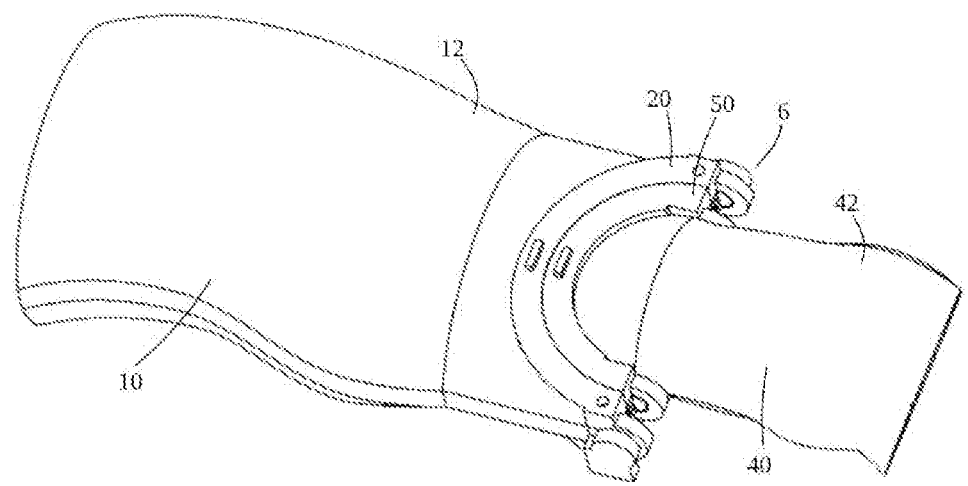
FIG. 2 is an isometric view of the combined port assembly of FIG. 1 showing the male and female port assemblies in an engaged configuration.

Referring to FIGS. 5-7, in various embodiments the frame members 52 and 54 are connected to one another via a common hinge joint 58. In various embodiments the frame members 52 and 54 may contain a gasket 55 along inner surfaces as desired to increase seal quality between the frame members 52 and 54 when oriented in the closed position (FIG. 5). In various embodiments outboard surfaces of the frame members 52 and 54 also may contain a gasket 60 as desired to increase seal quality between the male port assembly 40 and the female port assembly 10 when joined (FIG. 2). In some embodiments the gasket 55 and the gasket 60 may be provided as a single, contiguous piece of gasket material. In some other embodiments the gasket 55 and the gasket 60 may be provided as separate pieces of gasket material. In some embodiments the gasket 60 may protrude from the frame members 52 and 54 to provide attachment to the flexible material volume 42. In such embodiments, one end of the flexible material volume 42 may be secured to the gasket 60. However, it will be appreciated that in some embodiments (such as those for less critical applications) the inner surfaces of the frame members 52 and 54 need not (and, accordingly, do not) contain the gasket 55. Likewise, it will be appreciated that in some embodiments (such as those for less critical applications) the outboard surfaces of the frame members 52 and 54 need not (and, accordingly, do not) contain the gasket 60.

Still referring to FIGS. 5-7, in various embodiments the male hinged sub-assembly frame 50 may contain an intra-locking mechanism 57 to secure together the frame members 52 and 54. The male hinged sub-assembly frame 50 may contain an inter-locking mechanism 56 to secure together the male hinged sub-assembly frame 50 and the female hinged sub-assembly frame 20. The male hinged sub-assembly frame 50 may contain an external locking mechanism (not shown) which suitably may be similar to a corresponding external locking feature described below for the female port assembly 10. Also, in various embodiments one end of the flexible material volume 42 is secured to the inner circumference of the male hinged sub-assembly frame 50.

Figure 8:
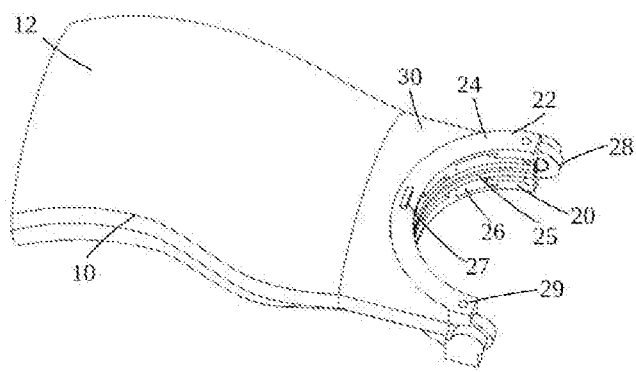
FIG. 8 is an isometric view of a female port assembly of FIG. 1 in a closed configuration.
Figure 9:
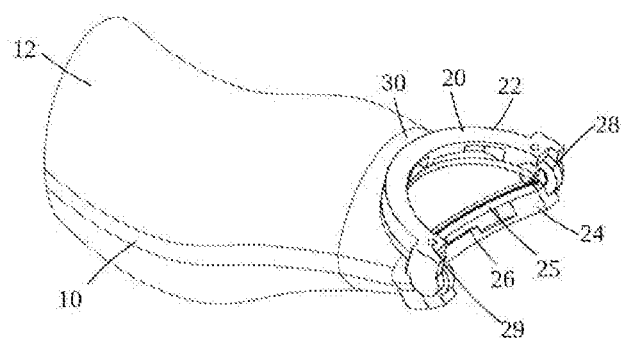
FIG. 9 is an isometric view of the female port assembly of FIG. 1 in a partially opened configuration.
Figure 10:
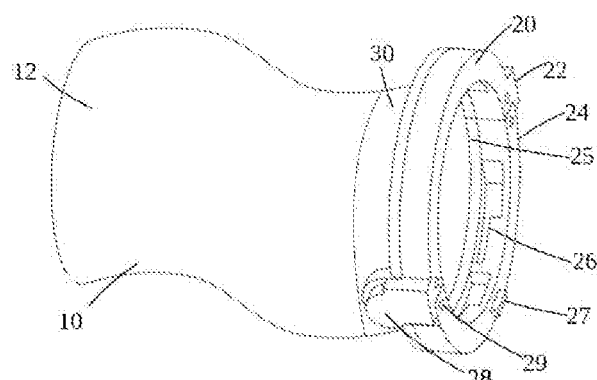
FIG. 10 is an isometric view of the female port assembly of FIG. 1 in a fully opened configuration.

Referring to FIGS. 8-10, in various embodiments the frame members 22 and 24 are connected to one another via a common hinge joint 28. In various embodiments the frame members 22 and 24 may contain a gasket 25 along inner surfaces as desired to increase seal quality between the frame members 22 and 24 when oriented in the closed position (FIG. 8). In various embodiments outboard surfaces of the frame members 22 and 24 also may contain a gasket 30 as desired to increase seal quality between the female port assembly 10 and the male assembly 40 when joined (FIG. 2). In some embodiments the gasket 25 and the gasket 30 may be provided as a single, contiguous piece of gasket material. In some other embodiments the gasket 25 and the gasket 30 may be provided as separate pieces of gasket material. In some embodiments the gasket 30 may protrude from the frame members 22 and 24 to provide attachment to the flexible material volume 12. In such embodiments, one end of the flexible material volume 12 may be secured to the gasket 30. However, it will be appreciated that in some embodiments (such as those for less critical applications) the inner surfaces of the frame members 22 and 24 need not (and, accordingly, do not) contain the gasket 25. Likewise, it will be appreciated that in some embodiments (such as those for less critical applications) the outboard surfaces of the frame members 22 and 24 need not (and, accordingly, do not) contain the gasket 30.

Still referring to FIGS. 8-10, in various embodiments the female hinged sub-assembly frame 20 may contain an intra-locking mechanism 27 to secure together the frame members 22 and 24. The female hinged sub-assembly frame 20 may contain an inter-locking mechanism 26 to secure together the male hinged sub-assembly frame 50 and the female hinged sub-assembly frame 20. The female hinged sub-assembly frame 20 may contain an external locking mechanism 29. Also, in various embodiments one end of the flexible material volume 12 is secured to the inner circumference of the female hinged sub-assembly frame 20.

In various embodiments, it will be appreciated that the inter-locking mechanisms 26 and 56 and the intra-locking mechanisms 27 and 57 may include any kind of locking mechanism or means for locking as desired for a particular application. Given by way of illustration only and not of limitation, suitable non-limiting examples of the inter-locking mechanisms 26 and 56 and the intra-locking mechanisms 27 and 57 may include a physical interference mechanism, a magnetic/electromagnetic mechanism, suction or vacuum, adhesion, a weld, external or internal restraint methods, and/or weight or gravity.

In some embodiments, the flexible material volumes 12 and 42 include a suitable flexible material which may be affixed directly to the female hinged sub-assembly frame 20 and/or the male hinged sub-assembly frame 50, respectively. In some such embodiments, the female hinged sub-assembly frame 20 and/or the male hinged sub-assembly frame 50 may, in turn, include a suitable rigid material or may be affixed to the gasket 25 and 55, respectively (which, in turn, includes a suitable flexible material).

In various embodiments the flexible material volume 12 may be embodied as an open-ended volume or sleeve (FIGS. 8-10) which may be attached directly to, and may provide a pathway into, any desired contained work space, machine, component, storage container, tooling, and/or material handling equipment, such as a glove or gloves, or through a barrier wall. In various embodiments, the flexible material volume 42 may be embodied as a closed (or enclosed) volume or sleeve (FIGS. 5-7). In various embodiments, the flexible material volumes 12 and 42 may be configured to have a circumference appropriately sized to be sealably attached to each frame 20 and 50, respectively (FIGS. 1-4).

Given by way of illustration only and not of limitation, the illustrative port assembly 6 and components thereof of FIGS. 1-10 show connection/disconnection capability between one closed volume (FIGS. 5-7) and one open-ended volume (FIGS. 8-10). However, it will be appreciated that various disclosed systems are also applicable to establishment of material transfer communication between two separate closed volumes, one closed volume and one open ended volume, or two open ended volumes.

In various embodiments and as shown in FIGS. 1-4, the port assembly 6 may employ external or internal catchments, sleeves, and/or lining materials to increase seal quality and/or to provide additional protections during use. In various embodiments, the port assembly 6 may employ means for gas or liquid purge capability internal to the port assembly 6, external to the port assembly 6, or within components of the port assembly 6.

In various embodiments, the flexible material volumes 12 and 42 may be made of any suitable flexible material as desired for a particular application, such as without limitation silicone rubber, any suitable rubber, any suitable flexible plastic material, any suitable flexible fibrous material, or the like. In various embodiments, the flexible material volumes 12 and 42 may be fashioned in the form of a bag with a closed end and one opening or may contain multiple openings. It will be appreciated that in some embodiments the flexible material volumes 12 and 42 may be made of fibrous materials such as canvas material in applications where abrasive wear is of concern while flexible plastics such as vinyl materials may be used for the flexible material volumes 12 and 42 in applications where impermeability may be desired. In various embodiments, the frame members 22, 24, 52, and 54 may be made of any rigid or semi-rigid material as desired for a particular application. It will be appreciated that the frame members 22, 24, 52, and 54 may be made of rigid materials such as steel in applications where structural strength is of concern, while the frame members 22, 24, 52, and 54 may be made of rigid or semi-rigid materials such as plastics in applications where lower unit cost is desired. In various embodiments, materials for the gaskets 25, 30, 55, and 60 may include any rigid, semi-rigid, fluid, or semi-fluid material as desired for a particular application. Given by way of non-limiting examples, fluoroelastomer materials such as FKM, nitrile, neoprene, and silicone are among materials which may be used for the gaskets 25, 30, 55, and 60 in applications where a strong seal may be desired.

Various embodiments of the port assembly 6 operate as follows. In general, the male hinged sub-assembly frame 50 and the female hinged sub-assembly frame 20 are attached to each other, the hinge joints 28 and 58 are aligned with each other, and the hinge joints 28 and 58 are opened.

Regarding connection, the female port assembly 10 and the male port assembly 40 are initially separated and individually closed (FIG. 1) and/or locked shut to seal their respective flexible material volumes 12 and 42. The female port assembly 10 and the male port assembly 40 are mated with each other—that is, physically brought together and aligned such that the female port assembly 10 and the male port assembly 40 maintain planar alignment (FIG. 2). In various embodiments, the interlocking mechanisms 26 and 56 are operated via rotational engagement. The female port assembly 10 and the male port assembly 40 are physically brought together in planar alignment while the hinge joints 28 and 58 are axially misaligned. Once engaged, the female port assembly 10 is rotated relative to the male port assembly 40 while maintaining planar alignment until the hinge joints 28 and 58 are axially aligned (FIG. 2). As permissible, the inter-locking mechanisms 26 and 56 are engaged to help prevent uncontrolled separation of the female port assembly 10 from the male port assembly 40. When the female port assembly 10 and the male port assembly 40 are engaged, the hinge joints 28 and 58 are axially aligned and the intra-locking mechanisms 27 and 57 may be disengaged as permissible. The female port assembly 10 and the male port assembly 40 are now physically attached to each other and the port assembly 6 is closed.

Regarding opening the port, after engagement between the female port assembly 10 and the male port assembly 40 the combined assemblage (that is, the port assembly 6) may be opened to operably connect the flexible material volume 12 of the female port assembly 10 with the flexible material volume 42 of the male port assembly 40. The port assembly 6 is opened by actuating the aligned hinge joints 28 and 58 (FIGS. 2-4). A physical, magnetic, or electronic locking mechanism 29 may be engaged and/or affixed to the female port assembly 10, the male port assembly 40, or both the female port assembly 10 and the male port assembly 40 to help prevent the hinge joints 28 and 58 from being prematurely actuated during use of the port assembly 6.

Regarding closing the port, prior to disengagement of the female port assembly 10 and the male port assembly 40, a locking mechanism as described in the preceding paragraph may be disengaged and/or removed to facilitate actuation of the hinge joints 28 and 58. The combined assemblage (that is, the port assembly 6) may be closed to physically isolate individual enclosed volumes of the female port assembly 10 and the male port assembly 40 (FIG. 2). Intra-locking mechanisms 27 and 57 may be engaged as permissible to lock the female port assembly 10 and the male port assembly 40 in a closed position.

Regarding disconnection, in various embodiments the interlocking mechanisms 26 and 56 may be disengaged and/or removed to allow separation of the female port assembly 10 and the male port assembly 40. In various embodiments, the interlocking mechanisms 26 and 56 are operated via rotational engagement. In such embodiments, disengagement may include rotation of the female port assembly 10 relative to the male port assembly 40 to mis-align the hinge joints 28 and 58 and/or to align interlocking features in proper orientation for physical disconnection of the female port assembly 10 from the male port assembly 40. The female port assembly 10 and the male port assembly 40 are physically separated from one another by moving the female hinged sub-assembly frame 20 and the male hinged sub-assembly frame 50, respectively, away from one another (FIG. 1).

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will also be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A port assembly comprising:
    a male port assembly including a male frame sub-assembly having first and second hinged male frame members rotatable about a first axis, the first and second hinged male frame members being sealable therebetween;
    a first flexible transfer sleeve attachable to the male port assembly and configured to operably connect the male port assembly with a first volume;
    a female port assembly including a female frame sub-assembly having first and second hinged female frame members rotatable about a second axis that is coaxially alignable with the first axis, the first and second hinged female frame members being sealable therebetween, the female frame sub-assembly being sealable with the male frame sub-assembly; and
    a second flexible transfer sleeve attachable to the female port assembly and configured to operably connect the female port assembly with a second volume,
    wherein the first flexible transfer sleeve and the second flexible transfer sleeve are chosen from a flexible plastic material and a flexible fibrous material.

2. The port assembly of claim 1, further comprising:
    a first hinge joint configured to hingedly couple the first and second hinged male frame members; and
    a second hinge joint configured to hingedly couple the first and second hinged female frame members.

3. The port assembly of claim 2, further comprising at least one locking mechanism chosen from a first locking mechanism disposed on the female port assembly and a second locking mechanism disposed on the male port assembly, the at least one locking mechanism being configured to selectively prevent actuation of at least one of the first and second hinge joints.

4. The port assembly of claim 1, further comprising:
    a first intra-locking mechanism disposed on the male frame sub-assembly and configured to releasably lock the male frame sub-assembly in a closed position; and
    a second intra-locking mechanism disposed on the female frame sub-assembly and configured to releasably lock the female frame sub-assembly in a closed position.

5. The port assembly of claim 1, further comprising:
    a first inter-locking mechanism disposed on the male frame sub-assembly; and
    a second inter-locking mechanism disposed on the female frame sub-assembly, the first and second inter-locking mechanisms being configured to matingly engage each other such that the male frame sub-assembly and the female frame sub-assembly remain coupled to each other when the first and second inter-locking mechanisms matingly engage each other.

6. The port assembly of claim 5, wherein the first and second inter-locking mechanisms are further configured to rotationally matingly engage each other.

7. The port assembly of claim 1, wherein an inner surface of the first hinged male frame member and an inner surface of the second hinged male frame member each include a gasket disposed thereon and configured to sealingly engage the inner surface of the first hinged male frame member and the inner surface of the second hinged male frame member.

8. The port assembly of claim 1, wherein an inner surface of the first hinged female frame member and an inner surface of the second hinged female frame member each include a gasket disposed thereon and configured to sealingly engage the inner surface of the first hinged female frame member and the inner surface of the second hinged female frame member.

9. The port assembly of claim 1, wherein outer surfaces of the first hinged male frame member, the second hinged male frame member, the first hinged female frame member, and the second hinged female frame member each include a gasket disposed thereon and configured to sealingly engage the outer surfaces of the first hinged male frame member and the first hinged female frame member and the outer surfaces of the second hinged male frame member and the second hinged female frame member.

10. A port assembly comprising:
a male port assembly including a male frame sub-assembly having first and second hinged male frame members rotatable about a first axis, the first and second hinged male frame members being sealable therebetween;
a first hinge joint configured to hingedly couple the first and second hinged male frame members;
a first intra-locking mechanism disposed on the male frame sub-assembly and configured to releasably lock the male frame sub-assembly in a closed position;
a first inter-locking mechanism disposed on the male frame sub-assembly;
a first transfer sleeve attachable to the male port assembly and configured to operably connect the male port assembly with a first volume;
a female port assembly including a female frame sub-assembly having first and second hinged female frame members rotatable about a second axis that is coaxially alignable with the first axis, the first and second hinged female frame members being sealable therebetween, the female frame sub-assembly being sealable with the male frame sub-assembly;
a second hinge joint configured to hingedly couple the first and second hinged female frame members;
a second intra-locking mechanism disposed on the female frame sub-assembly and configured to releasably lock the female frame sub-assembly in a closed position;
a second inter-locking mechanism disposed on the female frame sub-assembly, the first and second inter-locking mechanisms being configured to matingly engage each other such that the male frame sub-assembly and the female frame sub-assembly remain coupled to each other when the first and second inter-locking mechanisms matingly engage each other; and
a second transfer sleeve attachable to the female port assembly and configured to operably connect the female port assembly with a second volume.

11. The port assembly of claim 10, further comprising at least one locking mechanism chosen from a first locking mechanism disposed on the female port assembly and a second locking mechanism disposed on the male port assembly, the at least one locking mechanism being configured to selectively prevent actuation of at least one of the first and second hinge joints.

12. The port assembly of claim 10, wherein the first and second inter-locking mechanisms are further configured to rotationally matingly engage each other.

13. The port assembly of claim 10, wherein an inner surface of the first hinged male frame member and an inner surface of the second hinged male frame member each include a gasket disposed thereon and configured to sealingly engage the inner surface of the first hinged male frame member and the inner surface of the second hinged male frame member.

14. The port assembly of claim 10, wherein an inner surface of the first hinged female frame member and an inner surface of the second hinged female frame member each include a gasket disposed thereon and configured to sealingly engage the inner surface of the first hinged female frame member and the inner surface of the second hinged female frame member.

15. The port assembly of claim 10, wherein outer surfaces of the first hinged male frame member, the second hinged male frame member, the first hinged female frame member, and the second hinged female frame member each include a gasket disposed thereon and configured to sealingly engage the outer surfaces of the first hinged male frame member and the first hinged female frame member and the outer surfaces of the second hinged male frame member and the second hinged female frame member.

16. A method comprising:
sealingly closing a female port assembly;
sealingly closing a male port assembly;
sealingly mating the closed female port assembly and the closed male port assembly with each other;
axially aligning a hinge joint of the female port assembly and a hinge joint of the male port assembly with each other; and
opening the axially-aligned hinge joints of the female port assembly and the male port assembly.

17. The method of claim 16, further comprising:
closing the axially-aligned hinge joints of the female port assembly and the male port assembly.

18. The method of claim 16, further comprising:
separating the closed female port assembly and the closed male port assembly from each other.

19. The method of claim 16, wherein sealingly mating the closed female port assembly and the closed male port assembly with each other includes mating the closed female port assembly and the closed male port assembly while in planar alignment with each other and with the hinge joint of the female port assembly and the hinge joint of the male port assembly misaligned with each other.

20. The method of claim 16, wherein axially aligning a hinge joint of the female port assembly and a hinge joint of the male port assembly with each other includes rotating the female port assembly and the male port assembly relative to each other.

* * * * *